United States Patent
Kokotovich et al.

(10) Patent No.: US 9,626,367 B1
(45) Date of Patent: Apr. 18, 2017

(54) MANAGING A BACKUP PROCEDURE

(71) Applicant: Veritas Technologies LLC, Mountain View, CA (US)

(72) Inventors: Matthew J. Kokotovich, Saint Paul, MN (US); Satyajit Gorhe Parlikar, Shoreview, MN (US)

(73) Assignee: Veritas Technologies LLC, Mountain View, CA (US)

( * ) Notice: Subject to any disclaimer, the term of this patent is extended or adjusted under 35 U.S.C. 154(b) by 296 days.

(21) Appl. No.: 14/308,364

(22) Filed: Jun. 18, 2014

(51) Int. Cl.
*G06F 17/30* (2006.01)
*G06F 11/14* (2006.01)

(52) U.S. Cl.
CPC .... *G06F 17/30073* (2013.01); *G06F 11/1464* (2013.01)

(58) Field of Classification Search
None
See application file for complete search history.

(56) References Cited

U.S. PATENT DOCUMENTS

| | | |
|---|---|---|
| 5,212,784 A | 5/1993 | Sparks |
| 5,276,860 A | 1/1994 | Fortier et al. |
| 6,442,706 B1 | 8/2002 | Wahl et al. |
| 6,460,055 B1 | 10/2002 | Midgley et al. |
| 6,694,447 B1 | 2/2004 | Leach et al. |
| 6,714,952 B2 | 3/2004 | Dunham et al. |
| 6,950,871 B1 | 9/2005 | Honma et al. |
| 6,981,177 B2 | 12/2005 | Beattie |
| 7,047,379 B2 | 5/2006 | Boyd et al. |
| 7,082,506 B2 | 7/2006 | Nakano et al. |
| 7,103,740 B1 | 9/2006 | Colgrove et al. |
| 7,162,599 B2 | 1/2007 | Berkowitz et al. |
| 7,165,082 B1 | 1/2007 | Devos |
| 7,197,520 B1 | 3/2007 | Matthews et al. |
| 7,243,256 B2 | 7/2007 | Kaiya et al. |
| 7,251,749 B1 | 7/2007 | Fong et al. |
| 7,266,574 B1 | 9/2007 | Boudrie et al. |
| 7,266,655 B1 | 9/2007 | Escabi, II et al. |
| 7,284,104 B1 | 10/2007 | Wu et al. |
| 7,310,654 B2 | 12/2007 | McNeil |
| 7,430,647 B2 | 9/2008 | Sandorfi et al. |
| 7,465,154 B2 | 12/2008 | Devore et al. |
| 7,519,858 B2 | 4/2009 | Korlepara |

(Continued)

OTHER PUBLICATIONS

CommVault Systems Inc., Synthetic Full Backup, available from http://documentation.commvault.com/commvault/v10/article?p=features/backup/syn_full_best_practice.htm, as early as May 2014.
Veeam Software, Veeam Backup & Replication v7, available from http://www.veeam.com/native-tape-support.html, as early as May 2014.

(Continued)

*Primary Examiner* — Richard Bowen
(74) *Attorney, Agent, or Firm* — Rory D. Rankin; Meyertons, Hood, Kivlin, Kowert & Goetzel, P.C.

(57) ABSTRACT

A method for managing a backup procedure is described. In one embodiment, the method includes performing a first backup of a dataset, selecting a value N, dividing the dataset into N segments, and upon writing at least the portion of the dataset to the second storage system, performing a first rewrite. Each segment of the dataset includes 1/Nth of the dataset. The first backup includes writing at least a portion of the dataset from a first storage system to a second storage system. The first rewrite includes writing a first segment of the dataset from the first storage system to the second storage system.

20 Claims, 7 Drawing Sheets

(56) References Cited

U.S. PATENT DOCUMENTS

| | | | |
|---|---|---|---|
| 7,536,424 B2 | 5/2009 | Barzilai et al. | |
| 7,552,358 B1 | 6/2009 | Asgar-Deen et al. | |
| 7,627,727 B1 | 12/2009 | Kekre et al. | |
| 7,650,341 B1* | 1/2010 | Oratovsky | G06F 11/1435 707/999.01 |
| 7,694,086 B1 | 4/2010 | Bezbaruah et al. | |
| 7,725,438 B1 | 5/2010 | Shah et al. | |
| 7,743,022 B2 | 6/2010 | Kaasten et al. | |
| 7,756,833 B2 | 7/2010 | Van Ingen et al. | |
| 7,941,619 B1* | 5/2011 | Rossi | G06F 11/1458 707/625 |
| 7,949,635 B1 | 5/2011 | Korshunov et al. | |
| 8,131,964 B2 | 3/2012 | Retnamma et al. | |
| 8,244,681 B2 | 8/2012 | Laffin | |
| 8,990,161 B1* | 3/2015 | Singhal | G06F 11/1458 707/646 |
| 9,195,546 B1* | 11/2015 | McAlister | G06F 11/1451 |
| 2003/0145248 A1 | 7/2003 | McNeil | |
| 2003/0200480 A1 | 10/2003 | Beattie | |
| 2004/0034752 A1 | 2/2004 | Ohran | |
| 2004/0107381 A1* | 6/2004 | Bomfim | G06F 17/30312 714/4.12 |
| 2004/0153719 A1 | 8/2004 | Achiwa et al. | |
| 2004/0167942 A1 | 8/2004 | Oshinsky et al. | |
| 2004/0260899 A1 | 12/2004 | Kern et al. | |
| 2005/0038968 A1 | 2/2005 | Iwamura et al. | |
| 2005/0081091 A1 | 4/2005 | Bartfai et al. | |
| 2005/0193179 A1 | 9/2005 | Cochran et al. | |
| 2006/0101213 A1 | 5/2006 | Morita | |
| 2006/0242370 A1 | 10/2006 | Suzuki et al. | |
| 2007/0156793 A1 | 7/2007 | D'Souza et al. | |
| 2009/0172322 A1 | 7/2009 | Gilpin et al. | |
| 2009/0248762 A1 | 10/2009 | Prahlad et al. | |
| 2009/0307286 A1 | 12/2009 | Laffin | |
| 2010/0274763 A1 | 10/2010 | Ingen et al. | |
| 2011/0125714 A1 | 5/2011 | Manson | |
| 2012/0317379 A1* | 12/2012 | Ali | G06F 3/0653 711/158 |
| 2014/0258613 A1* | 9/2014 | Sampathkumar | G06F 11/1451 711/114 |

OTHER PUBLICATIONS

Veeam Software, Veeam Backup & Replication v7, User Guide—Administration—Working with Tape Media—Restoring Data from Tape—Restoring Backups from Tape—Step 3. Select a Restore Point, available from http://helpcenter.veeam.com/backup/70/vsphere/restore_backup_from_tape_point.html, as early as Apr. 2014.

Fugatt, Mark, "Backing up Exchange 2000 using Windows 2000 Backup," Jan. 20, 2003, 6 pages, http://www.msexchange.org/articles-tutorials/exchange-server-2000/monitoring-operations/MF020.html. [Retrieved Aug. 12, 2016].

"Backup Exec for Windows NT® and Windows® 2000 Administrator's Guide", Oct. 2001, pp. 613-654, Veritas Software Corporation.

"CDO Property Tags Constants Declarations Page", May 2, 2001, 16 pages, http://web.archive.org/web/20010502084858/http://www.outlookexchange.com/articles/home/cdopropertytagconstants.asp.

"IPStor® Continuous Data Replication", Jun. 29, 2005, 4 pages, FalconStor Software.

"Data Domain™ Replicator: Reducing the Cost of Online Data Replication for Disaster Recovery and Remote Backup", Sep. 2004, 15 pages, Data Domain.

"TeraMerge® Enables Multiple Level Synthetic Backup Consolidation for the Full Version of the True incremental Backup System®", Teradactyl LLC, 2007, 4 pages, http://web.archive.org/web/20120412052812/http://www.teradactyl.com/backup-knowledge/backup-documents/multimergeteramerge.pdf. [Retrieved Sep. 16, 2015].

"Partial Cumulative Incremental Backups Offer Unique Advantages to Customers", Teradactyl LLC, 2007, 4 pages, http://web.archive.org/web/20120417095436/http://www.teradactyl.com/backup-knowledge/backup-documents/partialcumulativeincremental.pdf. [Retrieved Sep. 16, 2015].

"TeraMerge® Enables Single Level Synthetic Backup Consolidation for the Lite Version of the True incremental Backup System®", 2007, Teradactyl LLC, 6 pages, http://web.archive.org/web/20120417084705/http://www.teradactyl.com/backup-knowledge/backup-documents/singlelevelteramerge.pdf. [Retrieved Sep. 16, 2015].

* cited by examiner

MANAGING A BACKUP PROCEDURE

BACKGROUND

Advancements in media delivery systems and data-related technologies continue to increase at a rapid pace. Increasing demand for accessible data has influenced the advances made to data-related technologies. Computer systems have increasingly become an integral part of data creation, data usage, and data storage. Computer systems may be used to carry out several data-related functions. The widespread access to data has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the widespread use of computers and mobile devices has come an increased presence of and continued advancements in data storage and backup products and systems. For example, advancements in cloud storage systems allow companies and individuals to backup data over multiple data storage sites. Nevertheless, benefits may be realized by providing systems and methods for improving data backup processes and data restores.

SUMMARY

According to at least one embodiment, a method for managing a backup procedure is described. In one embodiment, the method may include performing a first backup of a dataset, selecting a value N, dividing the dataset into N segments, and upon writing at least the portion of the dataset to the second storage system, performing a first rewrite. Each segment of the dataset may include 1/Nth of the dataset. The first backup may include writing at least a portion of the dataset from a first storage system to a second storage system. The first rewrite may include writing a first segment of the dataset from the first storage system to the second storage system.

In some embodiments, the method may include identifying a first new data added to the dataset on the first storage system since writing at least the portion of the dataset to the second storage system, and upon identifying the first new data, writing the first new data to the second storage system, the first new data being written to the second storage system with the first rewrite. In some cases, upon performing the first rewrite and writing the first new data to the second storage system, the method may include performing a second rewrite. The second rewrite may include writing a second segment of the dataset from the first storage system to the second storage system. In some embodiments, the method includes identifying a second new data added to the dataset on the first storage system since performing the first rewrite and writing the first new data to the second storage system. Upon identifying the second new data, the method may include writing the second new data to the second storage system. The second new data may be written to the second storage system together with the second rewrite.

In one embodiment, the method may include writing each segment of the dataset to the second storage system until each of the N segments is rewritten to the second storage system. Upon rewriting each of the N segments to the second storage system, the first backup may be removed from the second storage system. In some cases, the dataset on the first storage system may be updated. Upon rewriting each segment of the dataset to the second storage system, the method may include determining whether the updated dataset includes at least a portion of the first segment of the dataset written to the first storage system in the first rewrite. Upon determining the updated dataset includes at least a portion of the first segment of the dataset, the method may include writing to the second storage system the portion of the first segment of the dataset included in the updated dataset.

In one embodiment, the method may include identifying a third new data added to the updated dataset on the first storage system since rewriting each segment of the dataset to the second storage system, and upon identifying the third new data and determining the updated dataset includes a portion of the first segment of the dataset, writing the third new data to the second storage system with the portion of the first segment of the dataset included in the updated dataset. In some cases, upon determining the updated dataset does not include a portion of the first segment of the dataset, the third new data may be written to the second storage system. Upon writing at least the third new data to the second storage system, the method may include removing from the second storage system the first segment of the dataset written to the first storage system in the first rewrite.

In one embodiment, the methods may include updating the updated dataset on the first storage system, and upon writing at least the third new data to the second storage system, determining whether the second updated dataset includes at least a portion of the second segment of the dataset written to the first storage system in the second rewrite. Upon determining the second updated dataset includes at least a portion of the second segment of the dataset, the portion of the second segment of the dataset included in the second updated dataset may be written to the second storage system. In some cases, the method may include identifying a fourth new data added to the second updated dataset on the first storage system since writing to the second storage system the third new data with the portion of the first segment of the dataset included in the updated dataset, and upon identifying the fourth new data, writing the fourth new data to the second storage system with the portion of the second segment of the dataset included in the second updated dataset.

In one embodiment, upon determining the second updated dataset does not include a portion of the second segment of the dataset, the method may include writing the fourth new data to the second storage system, and upon writing at least the fourth new data to the second storage system, removing from the second storage system the second segment of the dataset written to the first storage system in the second rewrite.

A computing device configured for managing a backup procedure is also described. The computing device may include a processor and memory in electronic communication with the processor. The memory may store computer executable instructions that when executed by the processor cause the processor to perform the steps of performing a first backup of a dataset, selecting a value N, dividing the dataset into N segments, and upon writing at least the portion of the dataset to the second storage system, performing a first rewrite. Each segment of the dataset may include 1/Nth of the dataset. The first backup may include writing at least a portion of the dataset from a first storage system to a second storage system. The first rewrite may include writing a first segment of the dataset from the first storage system to the second storage system.

A non-transitory computer-readable storage medium storing computer executable instructions is also described. When the instructions are executed by a processor, the execution of the instructions may cause the processor to perform the steps of performing a first backup of a dataset, selecting a value N, dividing the dataset into N segments, and upon writing at least the portion of the dataset to the second storage system, performing a first rewrite. Each segment of the dataset may include 1/Nth of the dataset. The first backup may include writing at least a portion of the dataset from a first storage system to a second storage system. The first rewrite may include writing a first segment of the dataset from the first storage system to the second storage system.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to data backup processes and data restores. More specifically, the systems and methods described herein relate to managing a backup procedure in relation to data backups and data restores. Some embodiments of the systems and methods described herein relate to managing a backup procedure in relation to backing up a data image to tape.

Data Protection Applications (DPAs) using synthetic technologies have improved performance of backups to disk while maintaining simple restores. However, in some circumstances, moving such images to certain storage mediums may not result in similar benefits of optimization. Scenarios exist where user may perform large backups during short backup windows. Some forms of backup, however, may take a relatively large amount of time to backup. One may perform incremental duplications to each backup storage medium. Doing this, however, would make data restores impracticable with certain types of storage mediums, where each incremental image may have to be retrieved in order to perform a full restore.

The systems and methods described herein provide benefits and improvements between backing up by writing all of the data and writing only changed data, as with synthetic backup processes. In doing so, the backups or duplications are quicker than traditional full backups, and restores are limited to a pre-determined number of images. During a traditional incremental backup or duplication, only the changed data is written. This conventional method results in fast on-going, day to day operations of backing up data, but the same conventional methods also complicate restores by increasing the number of images required to perform a full restore. Such complications results in significant restore times. Conversely, the systems and methods described herein write the changed data, but also a certain percentage of unchanged data that was written previously. Limiting full restores to N images, each backup or duplication may write the changed data as well as on average 1/Nth of the total amount of data in each image. That way, after N operations, every part of the image has been rewritten once. To perform a full restore, only the previous N images are used. Not only do the systems and methods described herein make back up and duplicating times comparable to traditional full/incremental backup methods, but these same systems and methods also simplify restores and shorten restore times as compared to a traditional full/incremental schedule, this being due to the backups and duplications having a predictable length. Moreover, the progressive tracking of data from one backup operation to the next includes the benefit of selecting what data to include in each backup operation.

The systems and methods described herein include multiple applications. One example application includes file-based backups to tape. A backup admin may perform fast backups of very large filesystems by taking advantage of synthetic technologies. However, if the admin wants to duplicate these backups to tape, the duplications may take a significant amount of time as compared to other storage mediums. The present systems and methods, however, make each duplication to tape as quickly as traditional methods, while minimizing the number of images needed for a full restore to a manageable number.

As one example, images created during a backup from a client to a disk storage medium may be referred to as "Backup Images" while duplications of the backup images on disk to a tape storage medium may be referred to as "Tape Images." The value N refers to the number of images needed to perform a full restore. In one embodiment, the systems and methods described herein may determine whether a backup operation is part of an initial duplication of a backup image from disk to tape. If the backup operation is part of an initial duplication from disk to tape, the system may continue to duplicate the backup image to tape until the entire backup image is duplicated to tape. The systems and methods may select a value for N and divide the backup image on the disk into N segments. Following the initial duplication of the backup image, the method and systems may sequentially write each of the N segments of the backup image on the disk to tape, rewriting a portion of the data duplicated in the initial duplication of the backup image in the process. For each rewrite, any new files added to the current backup image on disk and/or any modified files in the backup image on disk since the last backup operation may be included in the rewrite to tape. A list may be made of the files in the current-N duplication. Any files from this list that are no longer found in the current backup image on disk may be removed from an applicable rewrite. Each of the remaining files still on disk may be written in the current-N duplication rewrite. In some cases, a tracking journal may be used to keep track of new data added to the backup image on disk, files changed on the backup image on disk, and/or files removed from the backup image on disk. In some cases, the tracking journal may be located on a client device. In some cases, the tracking journal may be stored with the backup image. Additionally, or alternatively, the data may be tracked using a DPA catalog, etc.

Figure 1:
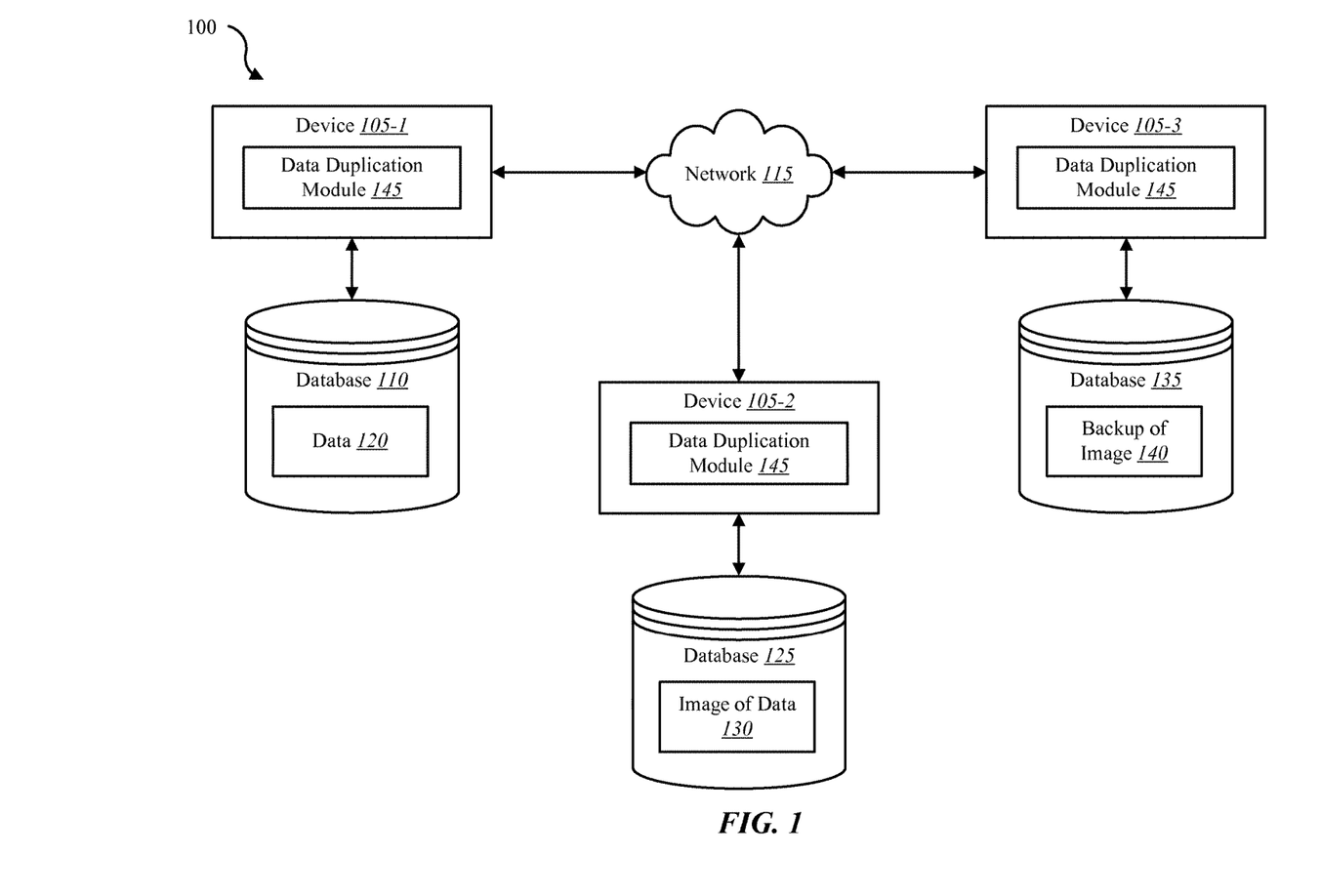
FIG. 1 is a block diagram illustrating one embodiment of an environment in which the present systems and methods may be implemented.

FIG. 1 is a block diagram illustrating one embodiment of an environment 100 in which the present systems and methods may be implemented. In some embodiments, the systems and methods described herein may be performed one or more devices (e.g., devices 105-1, 105-2, 105-3, etc.). As depicted, the environment 100 may include device 105-1, 105-2, and 105-3 connected to network 115. Each of the devices 105 may be coupled to a database (databases 110, 125, and 135, respectively).

Examples of the device 105 may include any combination of mobile computer devices, smart phones, personal computer devices, laptops, desktops, media content set top boxes, satellite set top boxes, cable set top boxes, DVRs, personal video recorders (PVRs), etc. In some cases, device 105 may include a data storage device such as a tape storage system, a storage server, a storage array network, a cloud storage system, etc. Any of devices 105 may include a server. Examples of servers may include any combination of a storage server, data server, a cloud server, a server associated with an automation service provider, proxy server, mail server, web server, application server, database server, communications server, file server, home server, mobile server, name server, etc.

In some configurations, the devices 105 may include a data duplication module 145. In some cases, at least one of devices 105 may include a user interface and/or application to enable a user to interact and/or configure the operations of data duplication module 145. Although the components of the device 105 are depicted as being internal to the device 105, it is understood that one or more of the components may be external to the device 105 and connect to device 105 through wired and/or wireless connections. In some embodiments, any of databases 110, 125, and 135 may be coupled to their respective device 105 via a wired or wireless environment. In some cases, any one of databases 110, 125, or 135 may be coupled internally to their respective device 105.

In some embodiments, devices 105 may communicate with each other via network 115. Examples of network 115 may include any combination of cloud data networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the devices 105 may not include a data duplication module 145. For example, devices 105 may include an application that allows devices 105 to interface with automation controller 155 via data duplication module 145 located on another device such as computing device 150 and/or server 110. In some embodiments, devices 105, automation controller 155, and server 110 may include a data duplication module 145 where at least a portion of the functions of data duplication module 145 are performed separately and/or concurrently on devices 105, automation controller 155, and/or server 110. Likewise, in some embodiments, a user may access the functions of data duplication module 145 on device 105-1 via an application running on a separate computer system.

As depicted, devices 105 may be coupled respectively to databases 110, 125, and 135. As previously stated, the databases may be internal or external to their respective devices. As one example, device 105-1 may depict a client computer device storing data 120, device 105-2 may depict a first storage system (e.g., a disk storage system, solid state drive storage system, etc.), and device 105-3 may depict a second storage system (e.g., a tape storage system). Database 110 may include data 120 and database 125 may include an image of data 130. For example, the image of data 130 from database 125 may include an image of the data 120 from database 110. Data duplication module 145 may generate an image of data 120 and store the generated image of data 120 in database 125 as image of data 130. Database 135 may include backup of image 140. The backup of image 140 from database 135 may include a backup of the image of data 130 from database 125. Data duplication module 145 may generate an a backup of the image of data 130 and store the generated backup of image of data 130 in database 135 as backup of image 140. Thus, data duplication module 145 may enable managing a backup procedure from at least one storage medium to another. In some embodiments, data duplication module 145 may be configured to perform the systems and methods described herein in conjunction with a user interface and/or application. Further details regarding the data duplication module 145 are discussed below.

Figure 2:
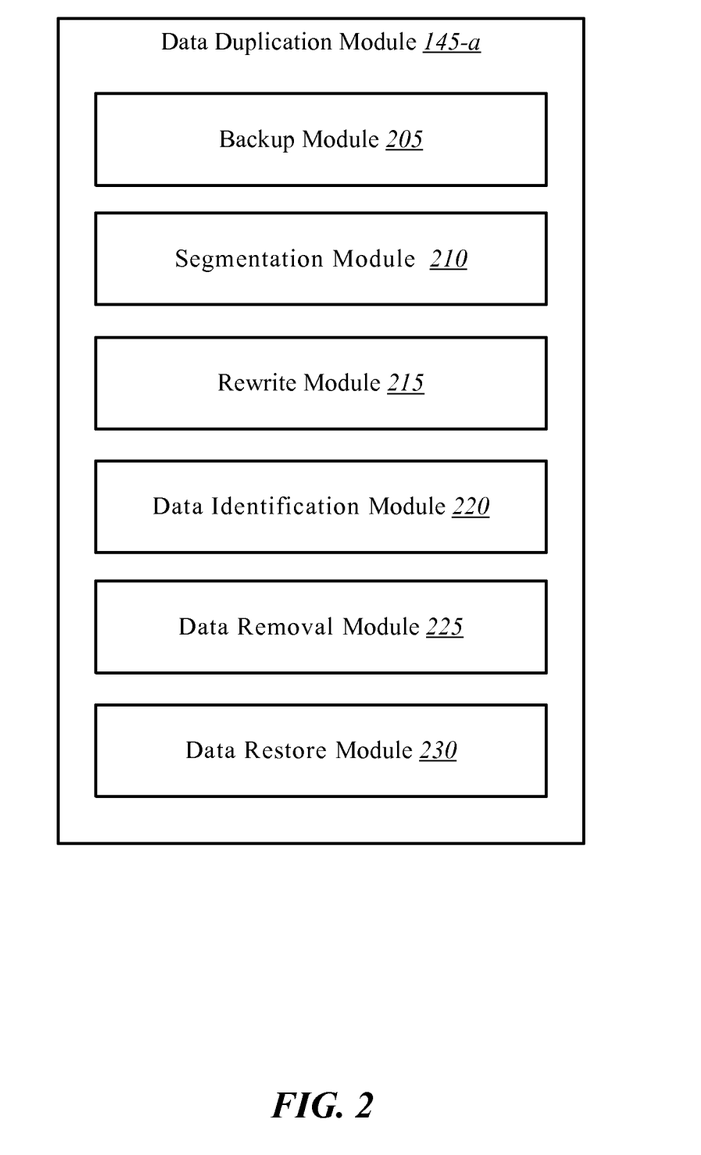
FIG. 2 is a block diagram illustrating one example of a data duplication module.

FIG. 2 is a block diagram illustrating one example of a data duplication module 145-a. Data duplication module 145-a may be one example of data duplication module 145 depicted in FIG. 1. As depicted, data duplication module 145-a may include backup module 205, segmentation module 210, rewrite module 215, data identification module 220, data removal module 225, and data restore module 230.

In one embodiment, the operations described herein with reference to data duplication module 145-a and modules thereof may refer to various types of backup scenarios. In one case, data duplication module 145-a may operate in relation to two storage systems. In some cases, data duplication module 145-a may operate in relation to three or more storage systems. Additionally, or alternatively, data duplication module 145-a may operate in relation to a single storage system (e.g., multiple storage mediums coupled to a single desktop, server, etc.). In the case of three or more storage systems, data duplication module 145-a may generate an image of data from a first system and store the image on a second system. As one example, data may be backed up from a first computer system such as smartphone, tablet, laptop, desktop, server, etc., to a separate computer system such as a local backup server, a storage array network, a cloud storage system, etc. The data duplication module 145-a may then generate a backup of the image on the second system and store this backup on a third system (e.g., backing up an image on a cloud storage system to a tape storage system). Alternatively, after creating the image of the data from the first storage system and storing the image on the second storage system, data duplication module 145-*a* may again copy data from the first storage system and store the copied data to a third storage system. Accordingly, the operations of the data duplication module 145 and associated modules described herein may refer to data transfers between a first storage system to a second storage system, a second storage system to a third storage system, transfers between three or more storage systems, as well as data transfers between storage mediums coupled to a single computing device.

In one embodiment, backup module 205 may perform a first backup of a dataset. The first backup may include writing at least a portion of a dataset from a first storage system to a second storage system. Thus, in some cases the backup module 205 may backup an entire dataset from the first storage system to the second storage system. Additionally, or alternatively, backup module 205 may perform an incremental backup of the dataset from the first storage system to the second storage system. One example of the dataset may include data 120 from FIG. 1. Backup module 205 may create a backup image of data 120 from a first storage system (e.g., database 110 and device 105-1) and store this backup image in a second storage system (e.g., image of data 130 stored in database 125 of device 105-2). As another example, backup module 205 may perform a backup of the image of data 130 from database 125 and device 105-2 (a first storage system) and store the backup as backup of image 140 stored in database 135 of device 105-3 (a second storage system). In some embodiments, backup module 205 may backup a dataset from a first storage device of a computer system to a second storage device of the same computer system. For example, device 105-1 may include a primary storage drive (e.g., hard disk, solid state disk, etc.). Device 105-1 may also include a secondary storage drive (e.g., database 110). For instance, database 110 may include a second hard disk or solid state disk coupled to device 105-1. In some cases, database 110 may include a portable storage medium attached to device 105-1 (e.g., a universal serial bus (USB) hard disk, USB solid state drive, USB thumb drive, etc.). Thus, backup module 205 may perform a first backup of a dataset from a primary storage drive coupled to device 105-1 to a secondary storage drive coupled to device 105-1.

In one embodiment, segmentation module 210 may select a value N. Segmentation module 210 may then divide a dataset into N segments. Each segment of the dataset may include 1/Nth of the dataset. Thus, with an N of 10 and a dataset of 100 MB, each segment includes 10 MB of the dataset. In one embodiment, no portion of one segment is duplicated in any other segment. Thus, each segment may include an equal and unique portion of the complete dataset such that combining all of the segments results in the complete dataset. Alternatively, each segment may include unequal and/or overlapping portions of the complete dataset. In some cases, N may be selected manually via user input. For example, data duplication module 145-*a* may display a user interface on computer screen from which a user may set a user policy that stipulates one or more configuration settings, such as the value of N. In some cases, N may be selected automatically (e.g., according to a default setting). For example, a default setting may select the value of N based on a predetermined number of backups per backup cycle. Each of the N segments may be backed up sequentially to a second storage system until all the segments are backed up. Thus, with N=4, a dataset is divided four ways, giving four equal segments of the dataset. If a backup operation occurs once per day, then the first segment is backed up to the second storage system on the first day, followed by the second segment on the second day, the third segment on the third day, and finally the fourth segment on the fourth day. Thus, a full backup cycle for N=4 includes four backup operations across four days with one backup per day. With a backup every hour, the full backup cycle still takes four backup operations, but is completed across four hours. Thus, in some cases, data duplication module 145-*a* may select a value for N based on a time period per full cycle (e.g., number of days per full cycle, etc.). Additionally, or alternatively, data duplication module 145-*a* may select a value for N based on a number of blocks of data per backup. In some cases, data duplication module 145-*a* may analyze the amount of data being backed up in relation to system performance (processor metrics, memory metrics, storage metrics, network metrics, bandwidth metrics, etc.) to automatically determine a value for N.

Upon the backup module 205 writing at least a portion of the dataset to a second storage system, rewrite module 215 may perform a first rewrite. The first rewrite may include writing a first segment of the N segments of the dataset from the first storage system to the second storage system. In association with the first rewrite, data identification module 220 may identify new data added to the dataset on the first storage system since writing at least the portion of the dataset to the second storage system. Thus, data identification module 220 may identify new data added to the first storage system since at least beginning to back up the dataset to the second storage system, if not after completing the backup. Upon identifying this new data, rewrite module 215 may write the new data to the second storage system along with the first rewrite.

Upon performing the first rewrite and writing the first new data to the second storage system, rewrite module 215 may continue to sequentially write each of the N segments of the dataset until all N segments have been written to the second storage system. Thus, rewrite module 215 may perform a second rewrite after completing the first rewrite. Similar to the first rewrite, the second rewrite may include writing a second segment of the N segments of the dataset from the first storage system to the second storage system. In some cases, data identification module 220 may identify a second new data added to the dataset on the first storage system since performing the first rewrite and writing the first new data to the second storage system. Accordingly, upon identifying the second new data, rewrite module 215 may write the second new data to the second storage system along with the second rewrite. Thus, rewrite module 215 may write each segment of the dataset to the second storage system until each of the N segments is rewritten to the second storage system. In some cases, upon rewriting each of the N segments to the second storage system, data removal module 225 may remove the first backup from the second storage system. Once each of the N segments have been rewritten, the first backup is fully duplicated on the second storage system. A complete restore may be achieved from the N segments rewritten to the second storage system (e.g., first rewrite, second rewrite, up to and including the Nth rewrite) without using the first backup. Thus, in order to remove redundancy and free up storage space, the first backup may be removed from the second storage system.

In some cases the dataset on the first storage system may be updated. For example, the same data that is originally written to the second storage may be updated on the first storage system. For instance, the data on the first storage system may be modified and/or deleted. Thus, upon rewriting each segment of the dataset to the second storage system, data identification module 220 may determine whether the updated dataset includes at least a portion of the first segment of the dataset written to the first storage system in the first rewrite. Upon determining the updated dataset includes at least a portion of the first segment of the dataset, rewrite module 215 may write to the second storage system the portion of the first segment of the dataset included in the updated dataset. Thus, if all of the same data that was written to the first storage system in the first rewrite still exists unmodified on the first storage system after rewriting each segment of the dataset, then the rewrite module 215 may write all of the same data to the second storage system. If only a portion of the data written to the first storage system in the first rewrite still exists on the first storage system after rewriting each segment of the dataset, then the rewrite module 215 may write the remaining portion of the same data to the second storage system.

In some embodiments, data identification module 220 may identify a third new data added to the updated dataset on the first storage system since rewriting each segment of the dataset to the second storage system. Upon identifying the third new data and determining the updated dataset includes a portion of the first segment of the dataset, rewrite module 215 may write the third new data to the second storage system with the portion of the first segment of the dataset included in the updated dataset. In some cases, upon determining the updated dataset does not include any portion of the first segment of the dataset, rewrite module 215 may write only the third new data to the second storage system. In either case, upon writing at least the third new data to the second storage system, data removal module 225 may remove from the second storage system the first segment of the dataset written to the first storage system in the first rewrite, as this first segment becomes redundant after rewriting it to the second storage system along with any new data added since the previous backup operation.

As stated above, in some cases the dataset on the first storage system may be updated at various times. Thus, upon the data identification module 220 determining the first storage system is updated since writing at least the third new data to the second storage system, may determine whether the second updated dataset, data identification module 220 may determine whether this latest updated dataset includes at least a portion of the second segment of the dataset written to the first storage system in the second rewrite. Upon determining the second updated dataset includes at least a portion of the second segment of the dataset, rewrite module 215 may write to the second storage system the portion of the second segment of the dataset included in the second updated dataset. In some cases, data identification module 220 may identify a fourth new data added to the second updated dataset on the first storage system since writing to the second storage system the third new data and the portion of the first segment of the dataset included in the updated dataset. Upon identifying the fourth new data, rewrite module 215 may write the fourth new data to the second storage system with the portion of the second segment of the dataset included in the second updated dataset.

In one embodiment, upon determining the second updated dataset does not include a portion of the second segment of the dataset, rewrite module 215 may write the fourth new data to the second storage system. Upon writing at least the fourth new data to the second storage system, data removal module 225 may remove from the second storage system the second segment of the dataset written to the first storage system in the second rewrite, as the second segment becomes redundant on the second storage system at this point.

In one embodiment, data restore module 230 may restore from the second storage system the most current version of the dataset on the first storage system using the N most recent rewrites to the second storage system of the N segments of the dataset from the first storage medium, the N most recent rewrites including any new data added to the dataset as well as all updates to the dataset.

Figure 3:
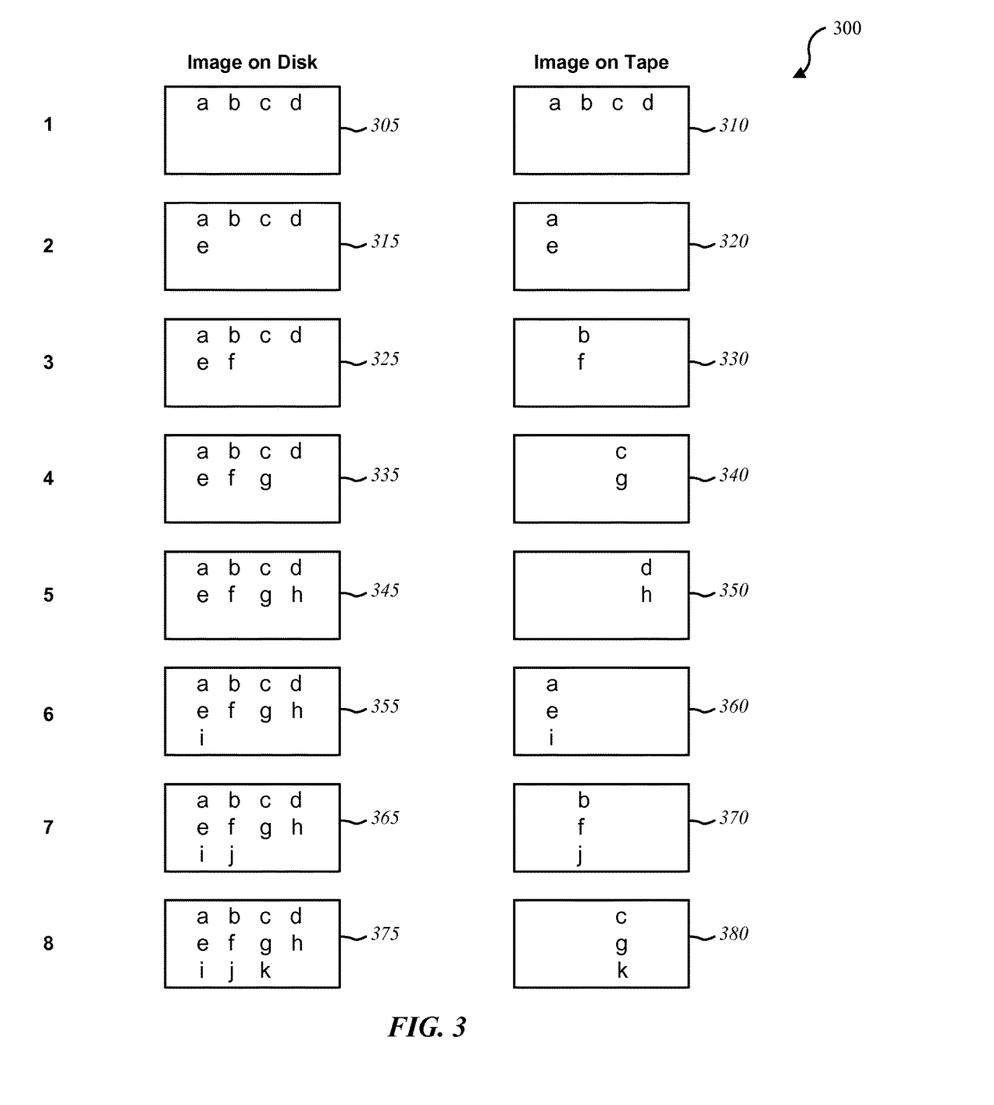
FIG. 3 is a block diagram illustrating one example of an environment for managing a backup procedure.

FIG. 3 is a block diagram illustrating one example of an environment 300 for managing a backup procedure. As depicted, environment 300 includes images on a disk storage medium (e.g., disk drive, solid state drive, etc.) and images on a tape storage medium. The numbers 1 through 8 down the left side of FIG. 3 are included to assist in the description of multiple image versions. Numbers 1 through 8 indicate an operation as well as an image version. For example, in operation 1 image 305 refers to disk image 1, while image 310 refers to tape image 1. In operation 2, image 315 refers to disk image 2, while image 320 refers to tape image 2, and so forth. In relation to the description of environment 300, N=4. As described herein, N may be set to another value, such as N=7 or N=15, etc. Setting N=4 means that for any image on disk, the equivalent image on tape may be restored using the four previous tape outs. For example, data duplication module 145 may restore image 8 on disk (image 375) from tape using only images 5, 6, 7, and 8 from tape (images 350, 360, 370, and 380), and so forth.

As depicted, disk image 1 (image 305) may be duplicated to tape in full as tape image 1 (image 310). With N=4, disk image 1 is divided into four segments. The segments may be equal, non-repeating segments. For ease of simplicity, disk image 1 is depicted as including dataset [a b c d]. Accordingly, the first segment of the N=4 segments of the dataset of image 305 includes [a], the second segment [b], third [c], and fourth [d]. Thus, after duplicating the full data set to tape (image 310) in operation 1, the first segment [a] is duplicated to tape as the second image to tape (image 320) in operation 2. Disk image 1, however, was modified at some point. Disk image 2 (image 315) includes the same data as disk image 1, but also includes [e]. Accordingly, new data [e] is written in tape image 2 along with [a], as shown in image 320.

Next, at operation 3, after writing [a] and [e] to tape image 2 in operation 2, the second segment [b] is duplicated to tape as the third image to tape (image 330) in operation 2. Disk image 2 (image 315), however, was modified at some point. Disk image 3 (image 325) includes the same data as disk image 2, but also includes [f]. Accordingly, new data [f] is written in tape image 3 along with [b], as seen in image 330.

Equivalent operations are performed at operations 4 and 5, where the third segment [c] and new data [g] are duplicated to tape image 4 (image 340) in operation 4, and fourth segment [d] and new data [h] are duplicated to image 5 on tape (image 340) in operation 5.

After tape image 5 is written to tape, the initial full image (tape image 1, image 310) is fully duplicated on tape. All of the data from the most current image on disk (image 345) are included in tape images 2-5 (images 320, 330, 340, and 350). Thus, tape image 5 may be restored from the four most recent operations to tape, tape images 2-5 (images 320, 330, 340, and 350). Accordingly, tape image 1 (image 310) may be removed from tape.

After the all N segments have been written to tape the first time (tape images 2-5), the current operation may be referred to a M. For each subsequent operation M after writing all N segments to tape, disk image M is compared to tape image M-N. Any files in tape image M-N that are still in disk image M are written to tape in operation M. Thus, for operation 6, disk image 6 (image 355) is compared to tape image 2 (image 320), because M=6, N=4, resulting in 6−4=2. Tape image 2 includes [a] and [e]. Both [a] and [e] are also found in disk image 6. Accordingly, [a] and [e] are re-written to tape in tape image 6 (image 360). Concurrently, disk image 6 (image 355) is compared to disk image 5 (image 345) to determine whether new data is found in disk image 6. Upon identifying [i] as new data in disk image 6, [i] is written to tape image 6 along with [a] and [e]. Tape image 2 (image 320) may then be removed from tape and a full restore may be obtained from tape images 3-6.

Likewise, in operation 7, disk image 7 (image 365) is compared to tape image 3 (image 330). Upon determining disk image 7 still includes [b] and [f] and that disk image 7 includes new data [j], [b], [f], and [j] may be written to tape as tape image 7 (image 370). Tape image 3 (image 330) may then be removed from tape and a full restore may be obtained from tape images 4-7. Similarly, in operation 8, disk image 8 (image 375) is compared to tape image 4 (image 340). Upon determining disk image 8 still includes [c] and [g] and that disk image 8 includes new data [k], [c], [g], and [k] may be written to tape as tape image 8 (image 380). Tape image 4 (image 340) may then be removed from tape and a full restore may be obtained from tape images 5-8.

Figure 4:
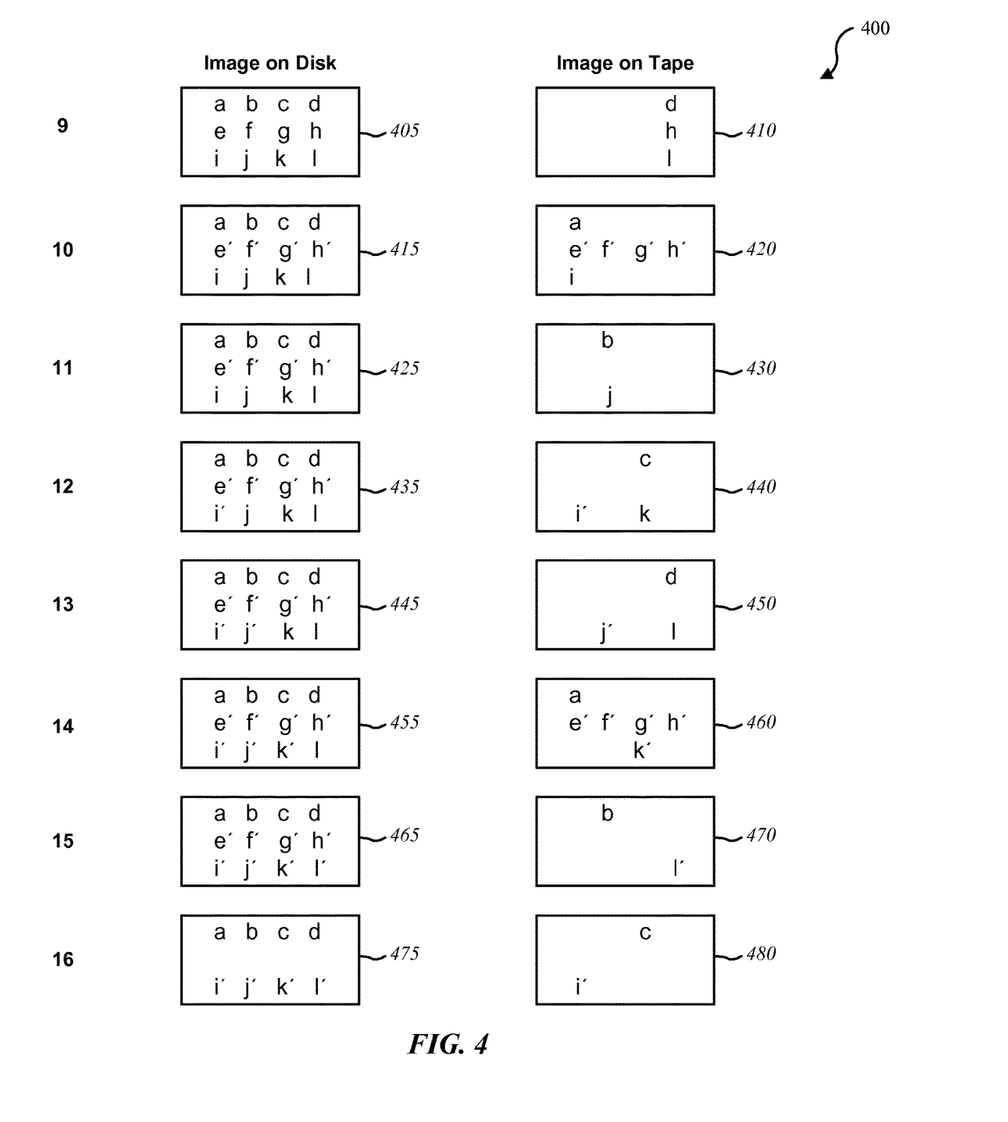
FIG. 4 is a block diagram illustrating another example of an environment for managing a backup procedure.

FIG. 4 is a block diagram illustrating one example of an environment 400 for managing a backup procedure. Environment 400 depicts a continuation of the operations of environment 300 of FIG. 3. Accordingly, as depicted, environment 400 includes images on a disk storage medium (e.g., disk drive, solid state drive, etc.) and images on a tape storage medium. As with FIG. 3, the numbers 9 through 16 down the left side of FIG. 4 are included to assist in the description of multiple image versions.

Similar to operations 7 and 8, in operation 9, disk image 9 (image 405) is compared to tape image 5 (image 350). Upon determining disk image 9 still includes [d] and [h] and that disk image 9 includes new data [l], [d], [h], and [l] may be written to tape as tape image 9 (image 410). Tape image 5 (image 350) may then be removed from tape and a full restore may be obtained from tape images 6-9.

In operation 10, modified data [e'] through [h'] is identified on disk image 10 (image 415), where [e] is modified as [e'] and so forth. Comparing disk image 10 to tape image 6 (image 360) and determining disk image 10 (image 415) still includes [a] and [i], but not [e], [a] and [i] are written to tape image 10 (image 420), while [e] is not. Additionally, modified data [e'] through [h'] is written to tape image 10 along with [a] and [i]. Tape image 6 (image 360) may then be removed from tape and a full restore may be obtained from tape images 7-10.

In operation 11, comparing disk image 11 to tape image 7 (image 370) and determining disk image 11 (image 425) still includes [b] and [j], but not [f], [b] and [j] are written to tape image 11 (image 430), while [f] is not. It is noted that data [f] is not written to tape image 11 with [b] and [j] because data [f] was already written to tape in tape image 10 (image 420). Since no new data is identified in disk image 11, only [b] and [j] are written to tape. Tape image 7 (image 370) may then be removed from tape and a full restore may be obtained from tape images 8-11.

In operation 12, modified data [i'] is identified on disk image 12 (image 435), where [i] is modified as [i']. Comparing disk image 12 to tape image 8 (image 380) and determining disk image 12 (image 435) still includes [c] and [k], but not [g], [c] and [k] are written to tape image 12 (image 440), while [g] is not. Additionally, modified data [i'] is written to tape image 12 along with [c] and [k]. Tape image 8 (image 380) may then be removed from tape and a full restore may be obtained from tape images 9-12.

In operation 13, modified data [j'] is identified on disk image 13 (image 445), where [j] is modified as [j']. Comparing disk image 13 to tape image 9 (image 410) and determining disk image 13 (image 445) still includes [d] and [l], but not [h], [d] and [l] are written to tape image 13 (image 450), while [h] is not. Additionally, modified data [j'] is written to tape image 13 along with [d] and [l]. Tape image 9 (image 380) may then be removed from tape and a full restore may be obtained from tape images 10-13.

In operation 14, modified data [k'] is identified on disk image 14 (image 455), where [k] is modified as [k']. Comparing disk image 14 to tape image 10 (image 420) and determining disk image 14 (image 455) still includes [a] and [e'] through [h'], but not [i], [a] and [e'] through [h'] are written to tape image 14 (image 460), while [i] is not. Additionally, modified data [k'] is written to tape image 14 along with [a] and [e'] through [h']. Tape image 10 (image 420) may then be removed from tape and a full restore may be obtained from tape images 11-14.

In operation 15, modified data [l'] is identified on disk image 15 (image 465), where [l] is modified as [l']. Comparing disk image 15 to tape image 11 (image 430) and determining disk image 15 (image 465) still includes [b], but not [j], [b] is written to tape image 15 (image 470), while [j] is not. Additionally, modified data [l'] is written to tape image 15 along with [b]. Tape image 11 (image 430) may then be removed from tape and a full restore may be obtained from tape images 12-15.

In operation 16, no new or modified data is identified on disk image 16 (image 475). Instead, [e'] through [h'] are removed. Comparing disk image 16 to tape image 12 (image 440) and determining disk image 16 (image 475) still includes [c] and [i'], but not [k], [c] and [i'] are written to tape image 16 (image 480), while [k] is not. Additionally, modified data [l'] is written to tape image 15 along with [b]. Tape image 11 (image 430) may then be removed from tape and a full restore may be obtained from tape images 12-15. It is noted that any remaining elements of [e'] through [h'] would have been written to tape in operation 18, but as depicted, [e'] through [h'] are removed in disk image 16 (image 475). Thus, if [a] and [k] remain, only those and any new/modified data may be written to a tape image 18.

Figure 5:
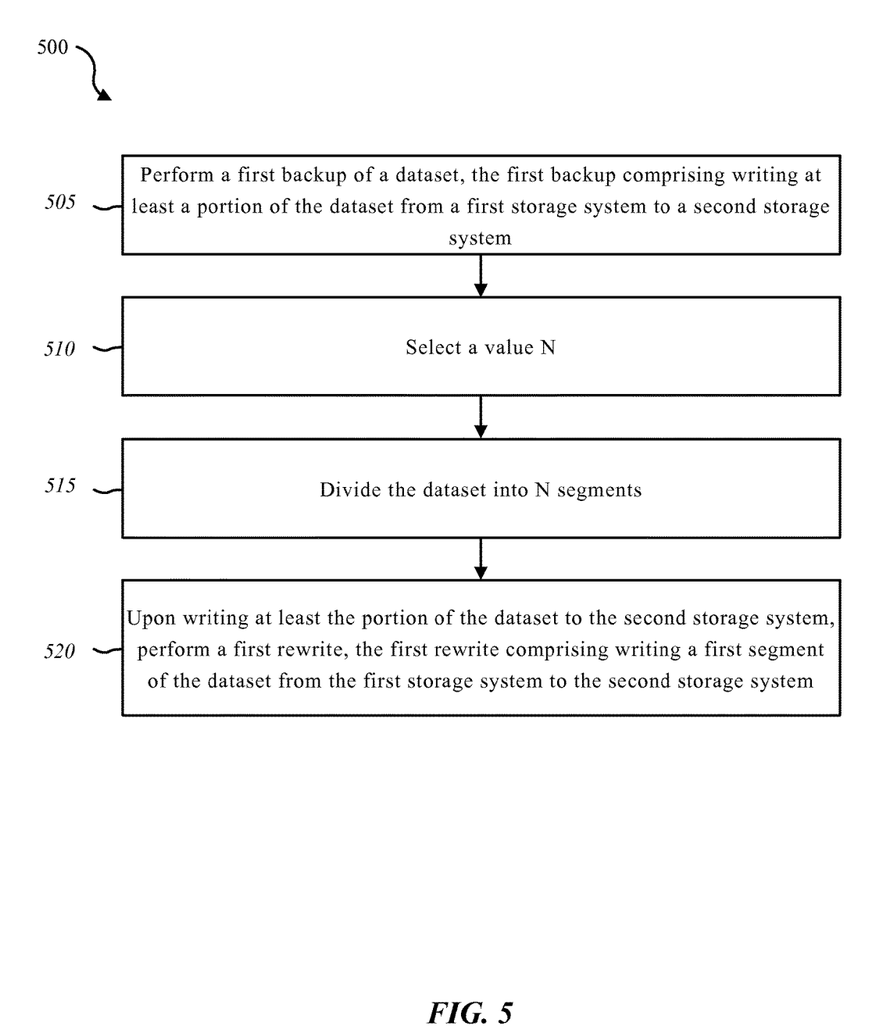
FIG. 5 is a flow diagram illustrating one embodiment of a method for managing a backup procedure.

FIG. 5 is a flow diagram illustrating one embodiment of a method 500 for managing a backup procedure. In some configurations, the method 500 may be implemented by the data duplication module 145 illustrated in FIG. 1 or 2. In some configurations, the method 600 may be implemented in conjunction with an application and/or user interface associated with one or more of devices 105 depicted in FIG. 1.

At block 505, a first backup of a dataset may be performed. The first backup may include writing at least a portion of the dataset from a first storage system to a second storage system. At block 510, a value N may be selected. At block 515, the dataset may be divided into N segments. At block 520, upon writing at least the portion of the dataset to the second storage system, a first rewrite may be performed. The first rewrite may include writing a first segment of the dataset from the first storage system to the second storage system.

Figure 6:
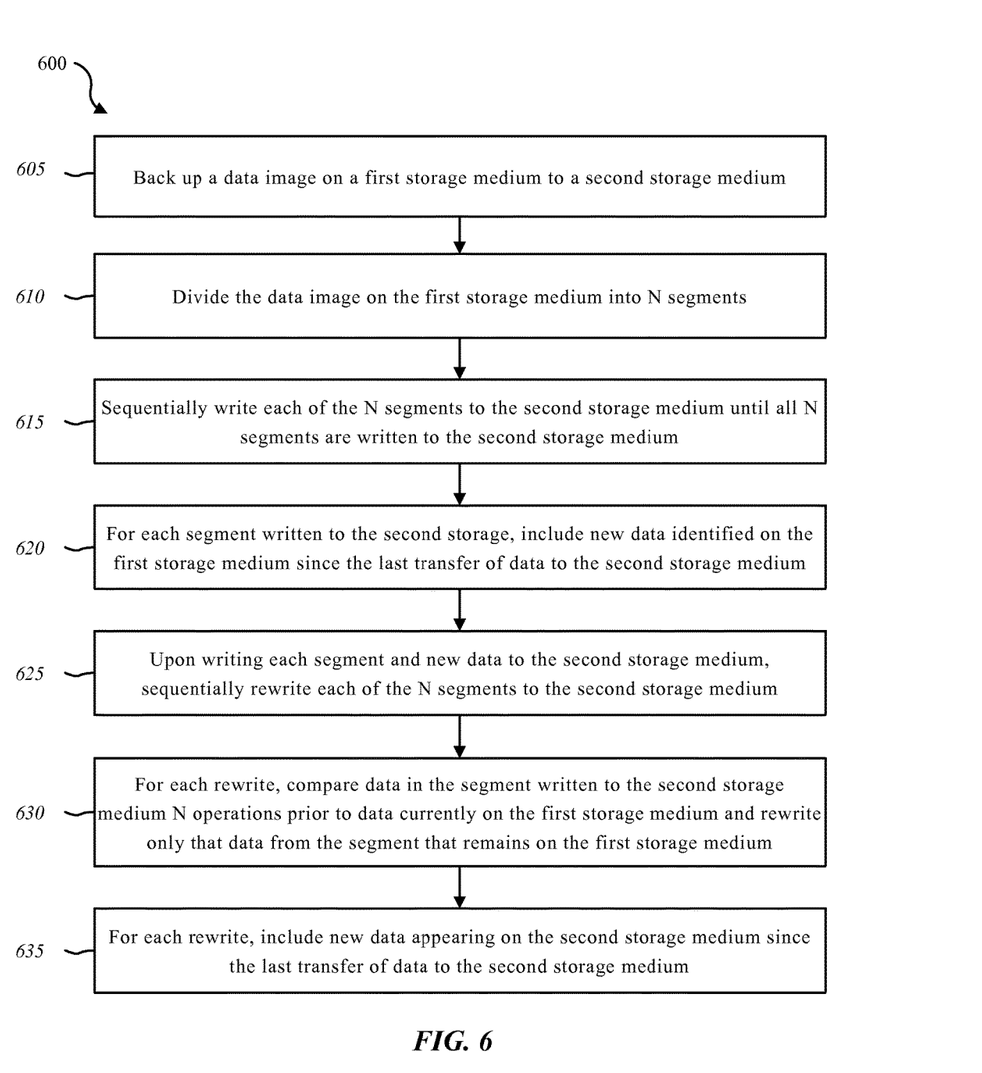
FIG. 6 is a flow diagram illustrating one embodiment of a method for managing a backup procedure.

FIG. 6 is a flow diagram illustrating one embodiment of a method 600 for managing a backup procedure. In some configurations, the method 600 may be implemented by the data duplication module 145 illustrated in FIGS. 1 and/or 2. In some configurations, the method 600 may be implemented in conjunction with an application and/or user interface associated with one or more of devices 105 depicted in FIG. 1.

At block 605, a data image on a first storage medium may be backed up to a second storage medium. At block 610, the data image on the first storage medium may be divided into N segments. At block 615, each of the N segments may be sequentially written to the second storage medium until all N segments are written to the second storage medium. At block 620, for each segment written to the second storage, new data identified on the first storage medium since the last transfer of data to the second storage medium may be included. At block 625, upon writing each segment and new data to the second storage medium, each of the N segments may be sequentially rewritten to the second storage medium. At block 630, for each rewrite, data in the segment written to the second storage medium N operations prior may be compared to data currently on the first storage medium. Only that data from the segment N operations prior that remains on the first storage medium is included in the rewrite. At block 635, for each rewrite, new data appearing on the second storage medium since the last transfer of data to the second storage medium may be included.

Figure 7:
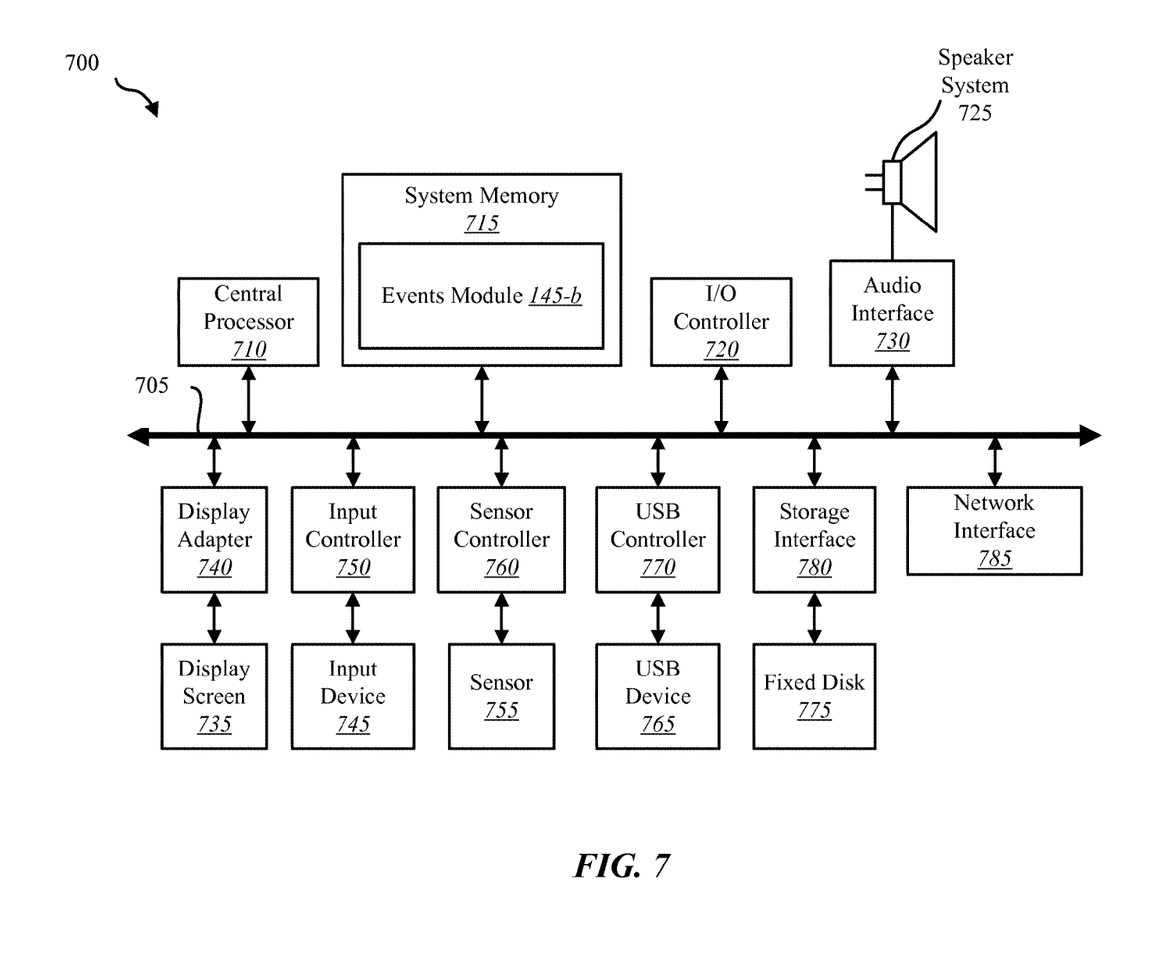
FIG. 7 depicts a block diagram of a computer system suitable for implementing the present systems and methods.

FIG. 7 depicts a block diagram of a controller 700 suitable for implementing the present systems and methods. The controller 700 may be an example of devices 105, computing device 150, and/or automation controller 155 illustrated in FIG. 1. In one configuration, controller 700 includes a bus 705 which interconnects major subsystems of controller 700, such as a central processor 710, a system memory 715 (typically RAM, but which may also include ROM, flash RAM, or the like), an input/output controller 720, an external audio device, such as a speaker system 725 via an audio output interface 730, an external device, such as a display screen 735 via display adapter 740, an input device 745 (e.g., remote control device interfaced with an input controller 750), multiple USB devices 765 (interfaced with a USB controller 770), and a storage interface 780. Also included are at least one sensor 755 connected to bus 705 through a sensor controller 760 and a network interface 785 (coupled directly to bus 705).

Bus 705 allows data communication between central processor 710 and system memory 715, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the data duplication module 145-b to implement the present systems and methods may be stored within the system memory 715. Applications resident with controller 700 are generally stored on and accessed via a non-transitory computer readable medium, such as a hard disk drive (e.g., fixed disk 775) or other storage medium. Additionally, applications can be in the form of electronic signals modulated in accordance with the application and data communication technology when accessed via interface 785.

Storage interface 780, as with the other storage interfaces of controller 700, can connect to a standard computer readable medium for storage and/or retrieval of information, such as a fixed disk drive 775. Fixed disk drive 775 may be a part of controller 700 or may be separate and accessed through other interface systems. Network interface 785 may provide a direct connection to a remote server via a direct network link to the Internet via a POP (point of presence). Network interface 785 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 700 wirelessly via network interface 785.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 7 need not be present to practice the present systems and methods. The devices and subsystems can be interconnected in different ways from that shown in FIG. 7. The aspect of some operations of a system such as that shown in FIG. 7 are readily known in the art and are not discussed in detail in this application. Code to implement the present disclosure can be stored in a non-transitory computer-readable medium such as one or more of system memory 715 or fixed disk 775. The operating system provided on controller 700 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for managing a backup procedure, comprising:
    performing a first backup procedure, wherein the first backup procedure comprises writing at least a portion of a dataset from a first storage system to a second storage system and is stored as a full backup file;
    dividing the dataset into N segments, each segment of the dataset comprising 1/Nth of the dataset; and
    performing N subsequent partial backup procedures, wherein for each of the N subsequent partial backup procedures, the method comprises:
        identifying new or changed data corresponding to the dataset on the first storage system since a previous backup procedure and storing the new or changed data from the first storage system to the second storage system; and
        rewriting one of the N segments from the first storage system to the second storage system, such that each of the N segments is rewritten from the first storage system to the second storage system once during the N subsequent backup procedures and is stored as a segment backup file, wherein a complete restore can be produced from the segment backup files without the full backup file.

2. The method of claim 1, the method further comprises:
    performing M subsequent backup procedures after the N subsequent partial backup procedures, wherein each M subsequent backup procedure comprises:
        comparing data of the dataset of the first storage system to the data stored as part of the M-N partial backup procedure; and
        rewriting one of the N segments included as part of the M-N partial backup procedure and storing the Mth subsequent backup procedure as a segment backup file, wherein a complete restore can be produced from a last N segment backup files.

3. The method of claim 1, further comprising selecting N such that each of the N segments includes an equal and unique portion of the dataset.

4. The method of claim 1, further comprising selecting N based on a number of backups desired within a given time period.

5. The method of claim 1, further comprising:
    upon completion of rewriting the N segments to the second storage system, removing the full backup file from the second storage system.

6. The method of claim 1, further comprising:
    updating the dataset on the first storage system; and
    upon rewriting each segment of the dataset to the second storage system during the N subsequent partial backup procedures, determining whether the updated dataset includes at least a portion of a first segment of the dataset written to the first storage system in a first rewrite performed during the N subsequent partial backup procedures.

7. The method of claim 6, further comprising:
    upon determining the updated dataset includes at least a portion of the first segment of the dataset, writing to the second storage system the portion of the first segment of the dataset included in the updated dataset.

8. The method of claim 6, further comprising:
    identifying a third new data added to the updated dataset on the first storage system since rewriting each segment of the dataset to the second storage system; and
    upon identifying the third new data and determining the updated dataset includes a portion of the first segment of the dataset, writing the third new data to the second storage system with the portion of the first segment of the dataset included in the updated dataset.

9. The method of claim 8, further comprising:
    upon determining the updated dataset does not include a portion of the first segment of the dataset, writing the third new data to the second storage system; and
    upon writing at least the third new data to the second storage system, removing from the second storage system the first segment of the dataset written to the first storage system in the first rewrite.

10. The method of claim 8, further comprising:
    updating the updated dataset on the first storage system; and
    upon writing at least the third new data to the second storage system, determining whether the second updated dataset includes at least a portion of the second segment of the dataset written to the first storage system in the second rewrite.

11. The method of claim 10, further comprising:
    upon determining the second updated dataset includes at least a portion of the second segment of the dataset, writing to the second storage system the portion of the second segment of the dataset included in the second updated dataset.

12. The method of claim 11, further comprising:
    identifying a fourth new data added to the second updated dataset on the first storage system since writing to the second storage system the third new data with the portion of the first segment of the dataset included in the updated dataset; and upon identifying the fourth new data, writing the fourth new data to the second storage system with the portion of the second segment of the dataset included in the second updated dataset.

13. The method of claim 12, further comprising:

upon determining the second updated dataset does not include a portion of the second segment of the dataset, writing the fourth new data to the second storage system; and upon writing at least the fourth new data to the second storage system, removing from the second storage system the second segment of the dataset written to the first storage system in the second rewrite.

14. A computing device configured for managing a backup procedure, comprising:

a processor;

memory in electronic communication with the processor, wherein the memory stores computer executable instructions that when executed by the processor cause the processor to perform the steps of:

performing a first backup procedure, wherein the first backup procedure comprises writing at least a portion of a dataset from a first storage system to a second storage system and is stored as a full backup file;

dividing the dataset into N segments, each segment of the dataset comprising 1/Nth of the dataset; and performing N subsequent partial backup procedures, wherein for each of the N subsequent partial backup procedures, the method comprises:

identifying new or changed data corresponding to the dataset on the first storage system since a previous backup procedure and storing the new or changed data from the first storage system to the second storage system; and rewriting one of the N segments from the first storage system to the second storage system, such that each of the N segments is rewritten from the first storage system to the second storage system once during the N subsequent backup procedures and is stored as a segment backup file, wherein a complete restore can be produced from the segment backup files without the full backup file.

15. The computing device of claim 14, wherein for each of the N subsequent backup procedures, the instructions executed by the processor cause the processor to perform the steps of:

performing M subsequent backup procedures after the N subsequent partial backup procedures, wherein each M subsequent backup procedure comprises:

comparing data of the dataset of the first storage system to the data stored as part of the M-N partial backup procedure; and rewriting one of the N segments included as part of the MN partial backup procedure and storing the Mth subsequent backup procedure as a segment backup file, wherein a complete restore can be produced from a last N segment backup files.

16. The computing device of claim 14, wherein the instructions executed by the processor cause the processor to perform the steps of selecting N such that each of the N segments includes an equal and unique portion of the dataset.

17. The computing device of claim 14, wherein the instructions executed by the processor cause the processor to perform the steps of selecting N based on rewriting the N segments in a given time period.

18. The computing device of claim 14, wherein the instructions executed by the processor cause the processor to perform the steps of:

upon completion of rewriting the N segments to the second storage system, removing the full backup file from the second storage system.

19. The computing device of claim 14, wherein the instructions executed by the processor cause the processor to perform the steps of:

updating the dataset on the first storage system; and upon rewriting each segment of the dataset to the second storage system during the N subsequent partial backup procedures, determining whether the updated dataset includes at least a portion of a first segment of the dataset written to the first storage system in the a first rewrite performed during the N subsequent partial backup procedures.

20. A non-transitory computer-readable storage medium storing computer executable instructions that when executed by a processor cause the processor to perform the steps of:

performing a first backup procedure, wherein the first backup procedure comprises writing at least a portion of a dataset from a first storage system to a second storage system and is stored as a full backup file;

dividing the dataset into N segments, each segment of the dataset comprising 1/Nth of the dataset; and performing N subsequent partial backup procedures, wherein for each of the N subsequent partial backup procedures, the method comprises:

identifying new or changed data corresponding to the dataset on the first storage system since a previous backup procedure and storing the new or changed data from the first storage system to the second storage system; and rewriting one of the N segments from the first storage system to the second storage system, such that each of the N segments is rewritten from the first storage system to the second storage system once during the N subsequent backup procedures and is stored as a segment backup file, wherein a complete restore can be produced from the segment backup files without the full backup file.

* * * * *

UNITED STATES PATENT AND TRADEMARK OFFICE
CERTIFICATE OF CORRECTION

PATENT NO. : 9,626,367 B1  
APPLICATION NO. : 14/308364  
DATED : April 18, 2017  
INVENTOR(S) : Kokotovich et al.

Page 1 of 1

It is certified that error appears in the above-identified patent and that said Letters Patent is hereby corrected as shown below:

In the Claims

Column 18, Claim 15, Line 2, please delete "MN partial" and substitute -- M-N partial --.

Column 18, Claim 19, Lines 28-29, please delete "in the a first rewrite" and substitute -- in a rewrite --.

Signed and Sealed this  
Twenty-third Day of May, 2017

Michelle K. Lee  
*Director of the United States Patent and Trademark Office*